United States Patent [19]

Tatara

[11] Patent Number: 5,085,107
[45] Date of Patent: Feb. 4, 1992

[54] APPARATUS FOR CONTROLLING HYDRAULICALLY OPERATED CONTINUOUSLY VARIABLE VEHICLE TRANSMISSION, HAVING MEANS FOR CHANGING POWER TRANSMITTING CAPACITY WITH INPUT TORQUE

[75] Inventor: Yudai Tatara, Susono, Japan

[73] Assignee: Toyota Jidosha Kabushiki Kaisha, Toyota, Japan

[21] Appl. No.: 578,445

[22] Filed: Sep. 7, 1990

[30] Foreign Application Priority Data

Sep. 18, 1989 [JP] Japan ................... 1-241414

[51] Int. Cl.$^5$ .............................................. F16H 9/18
[52] U.S. Cl. ........................................ 74/866; 474/12; 74/861
[58] Field of Search ............... 74/856, 868, 861, 866; 474/12, 18, 28

[56] References Cited

U.S. PATENT DOCUMENTS

| | | |
|---|---|---|
| 3,738,193 | 6/1973 | Sumiyoshi et al. ........... 74/731 |
| 4,552,545 | 11/1985 | Koivunen ................ 474/28 X |

FOREIGN PATENT DOCUMENTS

| | | |
|---|---|---|
| 0286924 | 10/1988 | European Pat. Off. . |
| 0297726 | 1/1989 | European Pat. Off. . |
| 56-80550 | 1/1981 | Japan ..................... 474/28 |
| 57-161361 | 10/1982 | Japan . |
| 63-29142 | 11/1983 | Japan . |
| 58-193962 | 11/1983 | Japan ..................... 474/28 |
| 2064686 | 6/1981 | United Kingdom ........... 474/28 |

*Primary Examiner*—Leslie A. Braun
*Assistant Examiner*—William O. Trousdell
*Attorney, Agent, or Firm*—Oblon, Spivak, McClelland, Maier & Neustadt

[57] ABSTRACT

An apparatus for controlling a hydraulically operated continuously variable transmission for a motor vehicle, which has an input member, an output member and a power transmitting member connecting the input and output members, and whose power transmitting capacity changes with a pressure of engagement of the power transmitting member with the input and output members. The apparatus includes a torque detector for detecting an input torque of the transmission, a hydraulic actuator adapted to receive a controlled pressure for controlling the pressure of engagement of the power transmitting member, and a device for changing the area of the pressure-receiving surface of the hydraulic actuator to thereby change the pressure of engagement of the power transmitting member, with the detected input torque of the transmission.

10 Claims, 6 Drawing Sheets

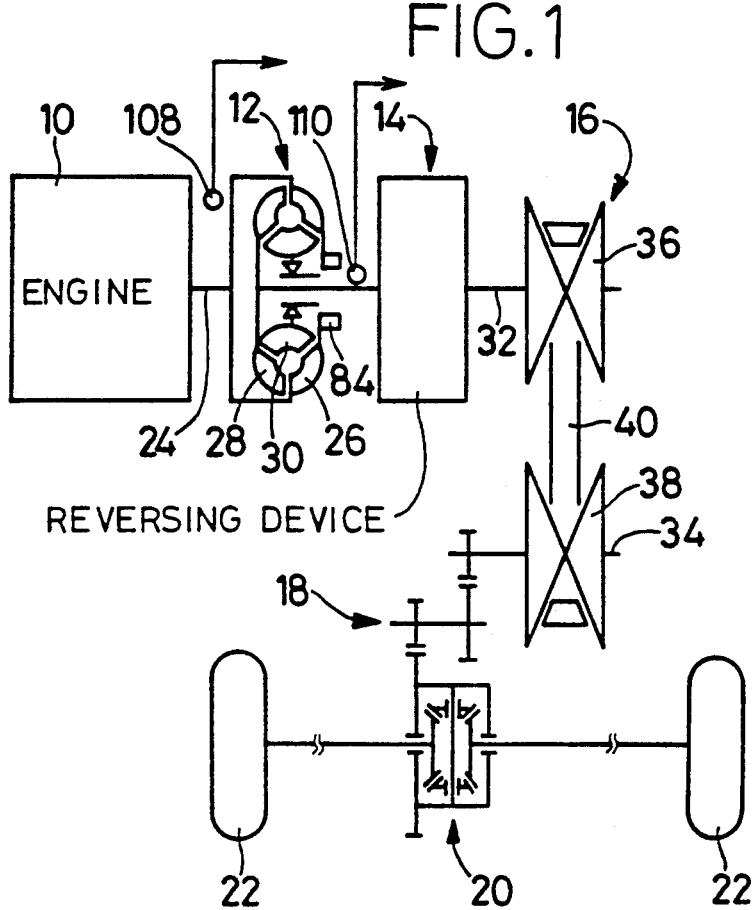
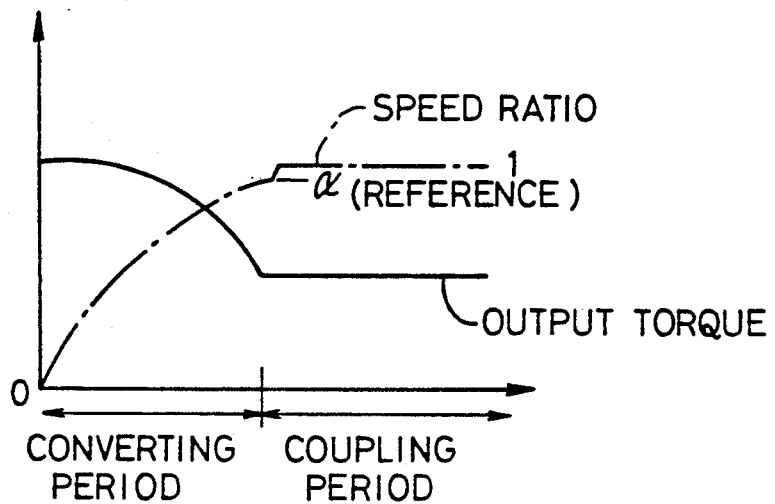

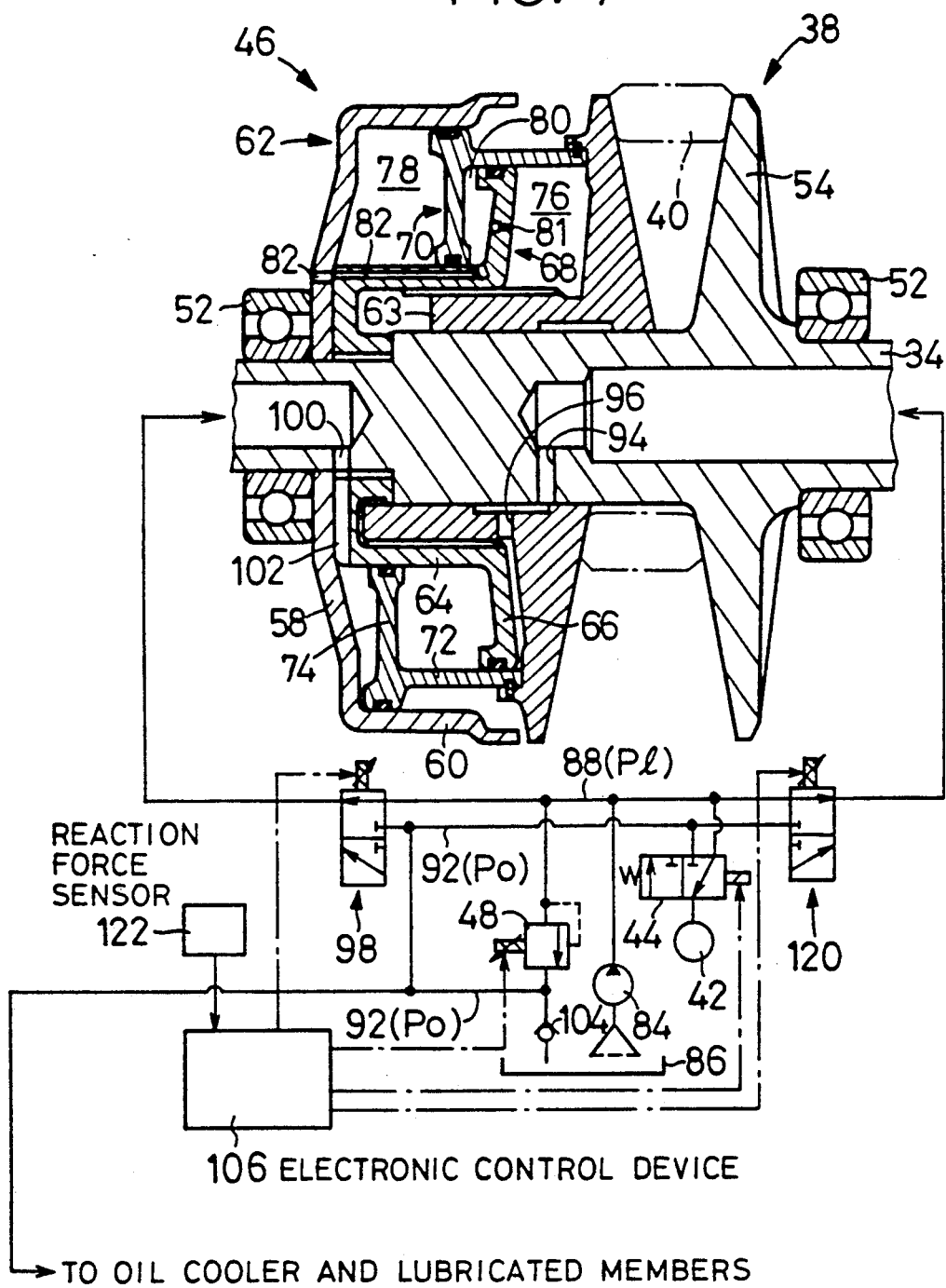

5,085,107

APPARATUS FOR CONTROLLING HYDRAULICALLY OPERATED CONTINUOUSLY VARIABLE VEHICLE TRANSMISSION, HAVING MEANS FOR CHANGING POWER TRANSMITTING CAPACITY WITH INPUT TORQUE

BACKGROUND OF THE INVENTION

1. Field of the Invention

The present invention relates to an apparatus for controlling a hydraulically operated continuously variable transmission for a motor vehicle. More particularly, the invention is concerned with an improvement in the hydraulic control arrangement for increasing the power transmitting capacity of such a continuously variable transmission with an increase in the input torque of the transmission.

2. Discussion of the Prior Art

In the art of transmitting power from the engine of a motor vehicle to the drive wheels, there is known a hydraulically operated continuously variable transmission whose speed ratio is steplessly or continuously variable and which is disposed in a power transmitting path between the engine and the drive wheels. Examples of such a continuously variable transmission (hereinafter referred to as "CVT", when appropriate) include a belt-and-pulley type CVT and a traction type CVT, wherein the power transmitting capacity is variable or adjustable.

The belt-and-pulley type CVT has a pair of variable-diameter pulleys, and a transmission belt connecting the pulleys to transmit power between the pulleys. The speed ratio of this type of CVT is changed by changing the effective diameters of the pulleys. Further, the pressure of engagement of the transmission belt with the pulleys is changed with a controlled pressure applied to one of two hydraulic cylinders provided for the respective two pulleys. Namely, the power transmitting capacity of the CVT is changed or adjusted by suitably controlling the pressure applied to the cylinder assigned to produce a tension of the belt.

On the other hand, the traction type CVT has an input cone member and an output cone member which are coaxially disposed in mutually facing relation with each other, and a power transmitting member in the form of rollers which are interposed between the input and output cone members, for transmitting power between the cone members. Each of the rollers has an axis of rotation which is pivotable in a plane which includes the axis of rotation of the cone members. The speed ratio of the traction type CVT is changed by pivoting the axes of rotation of the rollers, and the power transmitting capacity is changed by controlling the pressure of engagement of the rollers with the cone members, that is, the controlled pressure applied to a hydraulic cylinder assigned to produce a contact force between the rollers and the cone members. An example of the traction type CVT is illustrated in Publication No. 63-29142 of examined Japanese Patent Application.

Thus, the power transmitting capacity of the belt-and-pulley type CVT and traction type CVT is changed with or determined by the pressure of engagement of the power transmitting member in the form of the belt of rollers.

In the continuously variable transmission (CVT) as described above, it is proposed to maintain the power transmitting capacity or the pressure of engagement of the power transmitting member at a comparatively high level to avoid slipping of the power transmitting member, while the input torque received by the CVT is relatively high, for instance, while the output torque of a torque converter is larger than the input torque of the same, where the CVT receives power from the torque converter. More specifically, the pressure of engagement of the power transmitting member is changed depending upon the degree of torque amplification of the torque converter during the torque converting period. In a hydraulic control apparatus for a belt-and-pulley type CVT as disclosed in laid-open Publication No. 57-161361 of unexamined Japanese Patent Application, for example, the line pressure applied to establish the tension of the transmission belt is increased with the reaction force of the stator of a torque converter, as well as with the angle of opening of the throttle valve of the vehicle engine and the speed reduction ratio of the CVT (Nin/Nout = 1/speed ratio, where Nin: input shaft speed; Nout: output shaft speed; and speed ratio = Nout/Nin). That is, the line pressure is increased to establish an optimum tension of the transmission belt, not only according to an increase in the transmission torque of the CVT as a result of an increase in the amount of opening of the throttle valve, but also in response to a sudden temporary increase in the input torque of the CVT due to the torque amplification of the torque converter, so as to avoid slipping of the transmission belt.

In the known apparatus for controlling the continuously variable transmission as described above, the line pressure must be almost doubled, for example, increased from 20 kg/cm$^2$ to 40 kg/cm$^2$ while the input torque of the transmission is considerably increased due to the torque amplification by the torque converter from which the transmission receives the input torque. To permit this increase in the line pressure, the oil pump and pressure regulating valve of the hydraulic system must have a sufficiently high degree of operational accuracy, and the components of the relevant hydraulic cylinder, body of the valve and body of the oil pump must have sufficiently high strength or rigidity. Further, the hydraulic system must use sealing members which have a high degree of pressure tightness. Accordingly, the hydraulic system as a whole tends to be large-sized and expensive. Another disadvantage arises from the above-indicated line pressure increase, which results in an increased amount of power loss of the oil pump.

SUMMARY OF THE INVENTION

It is therefore an object of the present invention to provide an apparatus for controlling a hydraulically operated continuously variable transmission for a motor vehicle, which apparatus is capable of increasing the power transmitting capacity of the transmission with an increase in the input torque, without increasing the pressure applied to produce the pressure of engagement of the power transmitting member with the input and output members.

The above object may be accomplished according to the principle of the present invention, which provides an apparatus for controlling a hydraulically operated continuously variable transmission for a motor vehicle, which has an input member, an output member and a power transmitting member connecting the input and output members to affect power transmission therebetween, and whose power transmitting capacity changes with a pressure of engagement of the power transmitting member with the input and output members, comprising: (a) torque detecting means for detecting an input torque received by the input member of the continuously variable transmission; (b) a hydraulic actuator having a pressure-receiving surface defined by at least two chambers and which receives a controlled pressure having at least two values for controlling the pressure of engagement of the power transmitting member; and (c) engagement pressure changing means responsive to the torque detecting means, for changing the pressure of engagement of the power transmitting member by selectively applying the values of the controlled pressure to at least one of the at least two chambers, to thereby change the area of the hydraulic actuator which receives the larger of the values, and so to thereby change the pressing force to the power transmitting member, with the input torque detected by the transmitting member, with the input torque detecting means.

In the hydraulic control apparatus of the present invention constructed as described above, the engagement pressure changing means is adapted to change the area of the pressure-receiving surface of the hydraulic actuator which receives the larger value of the controlled pressure to thereby change the power transmitting capacity of the transmission, according to a change in the input torque of the transmission. Therefore, an increase in the input torque of the transmission results in an according increase in the power transmitting capacity of the transmission, without increasing the controlled pressure applied to the hydraulic actuator. The present arrangement, which does not increase the pressure applied to the hydraulic actuator, reduces the required operational accuracy of the oil pump and pressure regulating valve, and the required strength or rigidity of the components of the relevant hydraulic cylinder and the valve and pump bodies. Further, the required pressure tightness of the sealing members of the hydraulic system may be relatively low. Accordingly, the hydraulic system as a whole may be small-sized and less expensive, and the power loss of the oil pump is reduced.

In one form of the present invention, the continuously variable transmission receives power from an engine through a torque converter, and the torque detecting means detects the input torque of the transmission by detecting a ratio of an output speed of the torque converter to an input speed of the torque converter. In this case, the torque detecting means effects a determination, based on the speed ratio of the torque converter, as to whether an output torque of the torque converter transmitted to the transmission is larger than an input torque of the torque converter. Based on the engagement pressure engaging means, also called the determination, the area changing means, changes the area of the pressure-receiving surface of the hydraulic actuator.

In another form of the invention, the continuously variable transmission receives power from an engine through a torque converter having a stator, and the torque detecting means detects the input torque of the transmission by detecting a reaction force of the stator of the torque converter, and the area changing means changes the area of the pressure-receiving surface of the actuator, based on the detected reaction force of the stator of the torque converter.

In a further form of the invention, the continuously variable transmission includes a pair of pulleys as the input and output members, a pair of hydraulic cylinders for changing effective diameters of the pair of hydraulic cylinders, respectively, and a transmission belt functioning as the power transmitting member and connecting the pair of pulleys. One of the hydraulic cylinders which corresponds to the output member serves as the hydraulic actuator, and this cylinder has a first and a second fluid chamber each of which has a pressure-receiving surface adapted to receive the controlled pressure for producing a thrust in a direction so as to increase the pressure of engagement of the belt with the pulleys.

In one arrangement of the above form of the invention, the continuously variable transmission receives power from an engine having a throttle valve, and a pressure regulating valve is provided for regulating a line pressure so as to establish an optimum value of the pressure of engagement of the belt, based on a speed changing ratio of the transmission and an angle of opening of the throttle valve. Further, means for lowering the line pressure to a reduced pressure is provided. In this case, the area changing means includes means for comparing the input torque of the continuously variable transmission detected by the torque detecting means with a predetermined reference value, and applies the line pressure and the reduced pressure to the first and second fluid chambers, respectively, when the detected input torque of the transmission is smaller than the reference value. When the detected input torque exceeds the reference value, the area changing means applies to the second fluid chamber the line pressure in place of the reduced pressure.

In another arrangement of the same form of the invention, the continuously variable transmission is also adapted to receive power from an engine having a throttle valve. In this arrangement, the area of the pressure-receiving surface of the first fluid chamber is smaller than that of the second fluid chamber. Like the preceding arrangement, the present arrangement includes a pressure regulating valve for regulating a line pressure so as to establish an optimum value of the pressure of engagement of the belt, based on a speed changing ratio of the transmission and an angle of opening of the throttle valve, and further includes means for lowering the line pressure to a reduced pressure. The area changing means compares the input torque of the transmission detected by the torque detecting means with a predetermined first reference value and a predetermined second reference value higher than the first reference value. When the detected input torque of the transmission is smaller than the first reference value, the area changing means applies the line pressure and the reduced pressure to the first and second fluid chambers, respectively. When the detected input torque of the transmission is between the first and second reference values, the area changing means applies the reduced pressure and the line pressure to the first and second fluid chambers, respectively. When the detected input torque is higher than the second reference value, the area changing means applies the line pressure to both of the first and second fluid chambers.

In a further arrangement of the same form of the invention, the continuously variable transmission is also adapted to receive power from an engine having a throttle valve, and the apparatus further includes a pressure regulating valve for regulating a line pressure so as to establish an optimum value of the pressure of engagement of the belt, based on a speed changing ratio of the transmission and an angle of opening of the throttle valve. The apparatus also includes means for lowering the line pressure to a first reduced pressure, and means for lowering the line pressure to a second reduced pressure lower than the first reduced pressure. In this case, the area changing means compares the input torque of the transmission detected by the torque detecting means with a predetermined reference value. When the detected input torque of the transmission is larger than the reference value, the area changing means applies the line pressure and the first reduced pressure to the first and second fluid chambers, respectively. When the detected input torque of the transmission is smaller than the reference value, the area changing means applies the line pressure and the second reduced pressure to the first and second fluid chambers, respectively.

In a still further form of the present invention, the continuously variable transmission includes a pair of pulleys as the input and output members, a pair of hydraulic cylinders for changing effective diameters of the pair of hydraulic cylinders, respectively, and a transmission belt functioning as the power transmitting member and connecting the pair of pulleys. One of the pair of hydraulic cylinders which corresponds to the output member serves as the hydraulic actuator, and this cylinder has a first, a second and a third fluid chamber each of which has a pressure-receiving surface adapted to receive the controlled pressure for producing a thrust in a direction so as to increase the pressure of engagement of the belt with the pulleys. In this case, the continuously variable transmission may also be adapted to receive power from an engine having a throttle valve, and the apparatus may further include a pressure regulating valve for regulating a line pressure so as to establish an optimum value of the pressure of engagement of the belt, based on a speed changing ratio of the transmission and an angle of opening of the throttle valve, and means for lowering the line pressure to a reduced pressure. The area changing means compares the input torque of the transmission detected by the torque detecting means with a predetermined first reference value and a predetermined second reference value higher than the first reference value. When the detected input torque of the transmission is smaller than the first reference value, the area changing means applies the line pressure to the first fluid chamber and applies the reduced pressure to the second and third fluid chambers. When the detected input torque of the transmission is between the first and second reference values, the area changing means applies the line pressure to the first and second fluid chambers and applies the reduced pressure to the third fluid chamber. When the detected input torque is higher than the second reference value, the area changing means applies the line pressure to all of the first, second and third fluid chambers.

BRIEF DESCRIPTION OF THE DRAWINGS

The above and other objects, features and advantages of the present invention will become more apparent by reading the following detailed description of some presently preferred embodiments of the invention, when considered in conjunction with the accompanying drawings, in which:

FIG. 1 is a schematic view of a power transmitting system of a motor vehicle, which incorporates one embodiment of a hydraulic control apparatus of the present invention;

FIG. 3 is a graph indicating operating characteristics of a torque converter incorporated in the system of FIG. 1;

FIGS. 4, 5, 6 and 7 are views corresponding to that of FIG. 2, showing other embodiments of the invention.

DETAILED DESCRIPTION OF THE PREFERRED EMBODIMENTS

Figure 2:
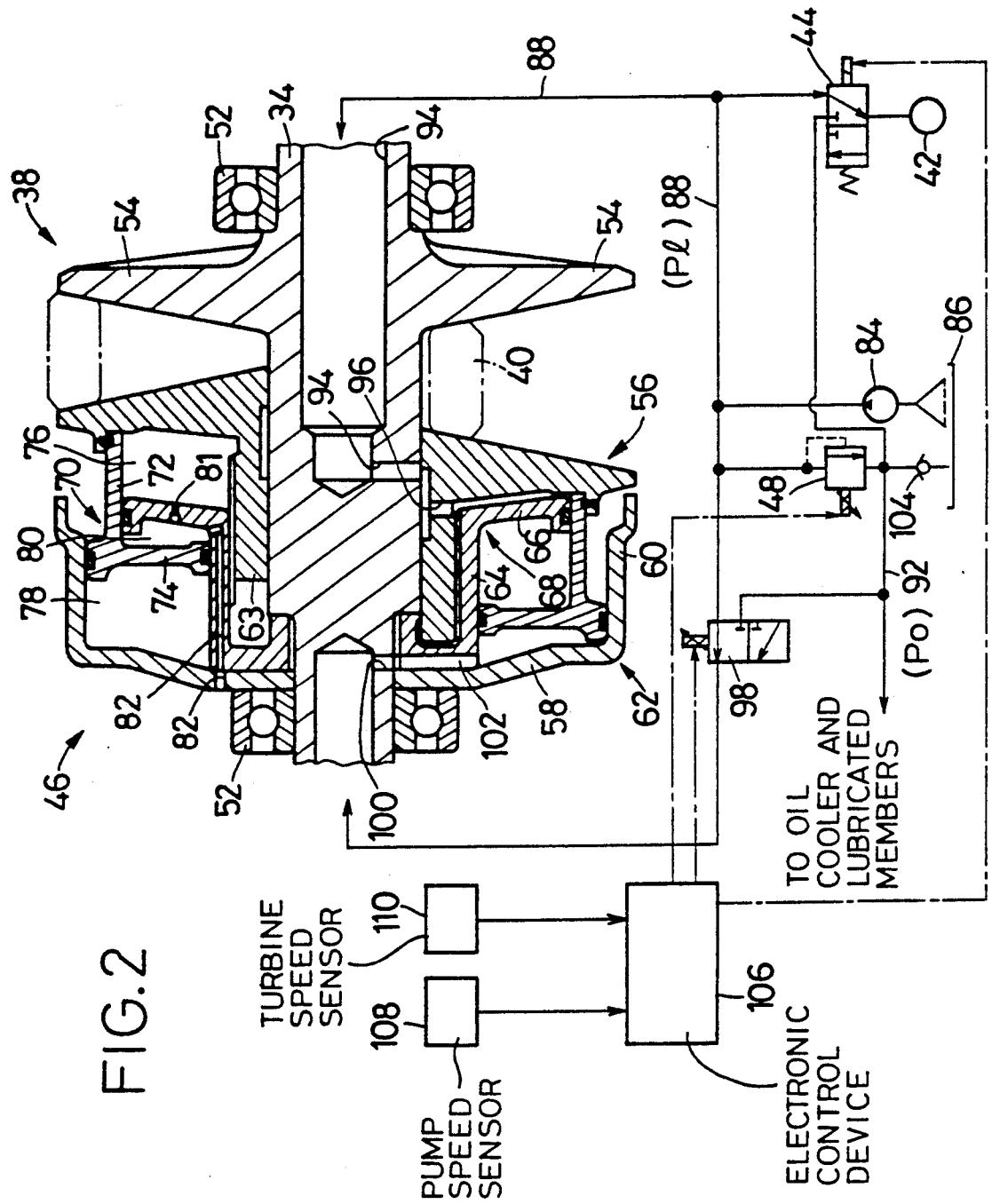
FIG. 2 is a view showing in cross section output side variable-diameter pulley and hydraulic cylinder of a continuously variable transmission of the power transmitting system of FIG. 1, and illustrating a hydraulic control arrangement for the output side hydraulic cylinder.

Referring first to the schematic view of FIG. 1, the power transmitting system shown therein is constructed for use on a front-engine front-drive motor vehicle (F—F car). In this system, power of the engine indicated at 10 in the figure is transmitted to a pair of front drive wheels 22, through a torque converter 12, a reversing device 14, a belt-and-pulley type continuously variable transmission 16 (hereinafter referred to as "CVT" or simply called "transmission", where appropriate), a speed reducing device 18, and a differential gear device 20. The torque converter 12 has a pump impeller 26 connected to a crankshaft 24 of the engine 10, a turbine impeller 28 connected to the reversing device 14, and a stator 30 fixed via a one-way clutch to a transmission unit casing which accommodates the torque converter 12, reversing device 14 and CVT 16.

The torque converter 12 exhibits torque transmitting characteristics as indicated in FIG. 3. The graph of this figure shows changes in the speed ratio and output shaft torque of the torque converter 12 when the vehicle is started with the engine 10 operated at a given angle of opening of the throttle valve. As indicated in FIG. 3, the speed ratio (output speed/input speed) of the torque converter 12 increases up to the final value of "1" while the output torque decreases down to the value of the input torque. The period during which the speed ratio and output torque are changing is called "converting period" as distinguished from the "coupling period" during which the speed ratio and output torque are held constant, i.e., the output speed and torque are substantially equal to the input speed and torque. In the converting period, the output torque of the torque converter 12 is larger than the input torque. Consequently, the input torque of the CVT 16 is larger in the converting period of the torque converter 12 than in the coupling period.

The reversing device 14 includes a planetary gear mechanism, a forward clutch and a reverse brake, which are well known in the art. The reversing device 14 is controlled by a hydraulic circuit according to a hydraulic signal for transmitting the torque received from the turbine impeller 28 of the torque converter 12 to an input shaft 32 of the CVT 16, so that the input shaft 32 is rotated in the appropriate direction for running the vehicle in the selected forward or reverse direction. The CVT 16 has a pair of variable-diameter pulleys 36, 38 (input side pulley 36 and output side pulley 38) provided on the respective input and output shafts 32, 34. These pulleys 36, 38 are connected by a power transmitting member in the form of a transmission belt 40, so that power is transmitted between the two pulleys 36, 38. The power transmitting capacity of the CVT 16 is controlled or determined by a tension of the belt 40, namely, by the pressure of engagement of the belt 40 with the pulleys 36, 38.

Referring next to FIG. 2, there are illustrated hydraulic and electric control arrangements for the input and output side pulleys 36, 38 of the CVT 16. Reference numeral 42 denotes an input side hydraulic cylinder for changing the width of the V-groove of the input side pulley 36, i.e., the effective diameter of the pulley 36. The hydraulic cylinder 42 is supplied with a working fluid (line pressure Pl which will be described) through a solenoid-operated shift control valve 44, so as to control or change the speed changing ratio (Nout/Nin, where Nout: speed of the output shaft 34, and Nin: speed of the input shaft 32) of the CVT 16.

The output side pulley 38 is provided with a hydraulic actuator in the form of a hydraulic cylinder 46, which functions primarily for adjusting the tension of the belt 40. To this end, the line pressure Pl is always applied to the output side hydraulic cylinder 46. The line pressure Pl is controlled by a solenoid-operated pressure regulating valve 48, so that the controlled pressure Pl is applied to the cylinder 46 for maintaining the tension of the belt 40 at an optimum level, as described below in detail.

As shown in FIG. 2, the output shaft 34 of the CVT 16 is rotatably supported by a transaxle housing (not shown) via bearings 52. The output shaft 34 is provided with a fixed rotor 54 fixed thereto, and a movable rotor 56 axially slidably mounted thereon for rotation therewith. The fixed and movable rotors 54, 56 cooperate to define the V-groove for engagement with the transmission belt 40.

To a portion of the output shaft 34 on the side of the movable rotor 56, there are fixed an outer cylinder member 62 and an inner cylinder member 68 disposed within the outer cylinder member 62. More specifically, the outer cylinder member 62 includes an annular bottom portion 58, and a cylindrical portion 60 which extends from the outer periphery of the bottom portion 58 in the axial direction of the shaft 34 toward the movable rotor 56. On the other hand, the inner cylinder member 68 includes an inner cylindrical portion 64 splined on a boss 63 of the movable rotor 56, and an outward flange portion 66 which extends from one axial end of the inner cylindrical portion 64 in the radially outward direction. With the boss 63 of the movable rotor 56 and the inner cylindrical portion 64 of the inner cylinder member 68 being splined to each other, the movable rotor 56 is slidably movable on the output shaft 34 such that the rotor 56 is rotated with the output shaft 34.

An annular piston 70 is disposed within an annular space between the outer and inner cylinder members 62, 68. The annular piston 70 includes a cylindrical portion 72 which is fixed to a radially outer portion of the movable rotor 56 and within which the outward flange portion 66 of the inner cylinder member 68 is slidably received. The annular piston 70 further includes an inward flange portion 74 which extends from one axial end of the cylindrical portion 72 in the radially inward direction. The inward flange portion 74 slidably engages the inner circumferential surface of the cylindrical portion 60 of the outer cylinder member 62 and the outer circumferential surface of the inner cylindrical portion 64 of the inner cylinder member 68.

Thus, the output side hydraulic cylinder 46 is constituted by the movable rotor 56, outer cylinder member 62, inner cylinder member 68 and annular piston 70.

The cylinder 46 has a first fluid chamber 76 defined by the movable rotor 56, outward flange portion 66 and cylindrical portion 72, and a second fluid chamber 78 defined by the outer cylinder member 62, inner cylindrical portion 64 and inward flange portion 74. The cylinder 46 moves the movable rotor 56 in the axial direction, when the pressurized fluid flows into or out of at least one of these first and second fluid chambers 76, 78. The hydraulic cylinder 46 has a first pressure-receiving surface corresponding to the first fluid chamber 76, and a second pressure-receiving surface corresponding to the second fluid chamber 78. The first and second pressure-receiving surfaces have substantially the same area. The cylinder 46 produces a first and a second thrust based on the line pressure Pl acting on the first and second pressure-receiving surfaces, independently of each other.

The inner cylinder member 68 and the annular piston 70 cooperate to define a third fluid chamber 80 which communicates with the atmosphere through a fluid passage 82 defined by the inner cylindrical portion 64 of the inner cylinder member 68 and the bottom portion 58 of the outer cylinder member 62. However, the third fluid chamber 80 is filled with the fluid, since the outward flange portion 66 of the inner cylinder member 68 has a restricted passage 81 which communicates the first and third fluid chambers 76, 80. The third fluid chamber 80 functions to almost or substantially offset or cancel a rise in the pressures in the first and second fluid chambers 76, 78 which occurs due to the centrifugal force produced by the rotating cylinder 46.

The oil pump 84 is driven by the engine 10, to pressurize the fluid returned to an oil reservoir 86 and deliver the pressurized fluid to a line-pressure passage 88. The pressure regulating valve 48 indicated above is operated in response to a control signal received from an electronic control device 106, to control the amount of flow of the pressurized fluid from the line-pressure passage 88 into a low-pressure passage 92, so that the line pressure Pl in the pressure line is regulated to a suitable level. The thus regulated line pressure Pl is applied to the shift control valve 44, and is always applied to the first fluid chamber 76 through a passage 94 formed through the output shaft 34, and a passage 96 formed through the movable rotor 56.

A solenoid-operated switch valve 98 is provided in connection with the line-pressure passage 88 and the low-pressure passage 92. The switch valve 98 has a low-pressure position for fluid communication between the low-pressure passage 92 and the second fluid chamber 78, and a high-pressure position for fluid communication between the line-pressure passage 88 and the second fluid chamber 78. When the switch valve 98 is placed in the low-pressure position according to a low-pressure signal from the control device 106, a lubrication pressure Po in the low-pressure passage 92 acts on the pressure-receiving surface of the second fluid chamber 78, through a passage 100 formed through the output shaft 34, and a passage 102 formed between the outer and inner cylinder members 62, 68. When a high-pressure signal is received from the control device 106, the switch valve 98 is placed in the high-pressure position so that the line pressure Pl acts on the pressure-receiving surface of the second fluid chamber 78 through the passages 100, 102. It will therefore be understood that the control device 106 and the switch valve 98 serve as engagement pressure, or area changing, means for changing the engagement pressure of the power transmitting member in two steps by changing the total area of the pressure-receiving surface of the output side hydraulic cylinder 46 which receives the controlled line pressure Pl.

A portion of the fluid which flows from the line-pressure passage 88 into the low-pressure passage 92 through the pressure regulating valve 48 and the switch valve 98 is returned to the reservoir 86 through a check valve 104. The rest of the fluid in the low-pressure line is used as a lubricant which is fed to an oil cooler and bearings and other lubricated members of the power transmitting system. The check valve 104 determines the lubrication pressure Po in the low-pressure passage 92, which is sufficiently lower than the line pressure Pl and higher than the atmospheric pressure. The lubrication pressure Po is high enough for the fluid in the low-pressure passage 92 to be fed to the oil cooler and lubricated members.

The electronic control device 106 is constituted by a so-called microcomputer, which incorporates a central processing unit, a read-only memory, and a random-access memory. The central processing unit processes various input signals according to a control program stored in the read-only memory, while utilizing a temporary data storage function of the random-access memory, so that control signals are produced to operate the solenoid-operated shift control valve 44, pressure regulating valve 48 and switch valve 98.

The input signals received by the control device 106 include a throttle signal indicative of an angle of opening $\theta$ of the throttle valve of the engine 10, an input speed signal indicative of the speed of the input shaft 32 of the CVT 16, and an output speed signal indicative of the speed of the output shaft 34 of the CVT 16. The control device 106 calculates a running speed V of the motor vehicle, based on the output speed signal, and calculates a speed changing ratio $e_c$ of the CVT 16, based on the input and output speed signals. The control device 106 also receives a pump speed signal generated by a pump speed sensor 108, and a turbine speed signal generated by a turbine speed sensor 110. The pump and turbine speed signals indicate the speeds of the pump and turbine impellers 26, 28, respectively. Based on these speed signals, the control device 106 calculates a speed ratio $e_t$ (speed of the turbine impeller 28/speed of the pump impeller 26) of the torque converter 12. Since the speed ratio $e_t$ has a known relation with the output torque of the converter 12 (i.e., input torque of the CVT 16) as indicated in FIG. 3, the input torque of the CVT 16 can be detected or determined by the calculated speed ratio $e_t$ of the torque converter 12. In this embodiment, therefore, the control device 106 and the speed sensors 108, 110 cooperate to provide torque detecting means for detecting the input torque received by the input shaft 32 of the CVT 16, or determining whether the output torque is larger than the input torque of the torque converter 12.

For controlling the speed ratio $e_c$ of the belt-and-pulley type continuously variable transmission or CVT 16, the control device 106 determines a target or desired value Nin* of the speed of the input shaft 32, based on the detected throttle opening angle $\theta$ and the calculated vehicle running speed V, according to a predetermined optimum relationship among the target input shaft speed Nin*, throttle opening angle $\theta$ and vehicle running speed V. This relationship is determined so that the engine 10 is operated so as to minimize the fuel consumption and assure high drivability of the vehicle. The input side hydraulic cylinder 42 is controlled to change the effective diameter of the input side pulley 36, such that the actual speed Nin of the input shaft 32 of the CVT 16 coincides with the determined desired value Nin*. Further, the line pressure Pl in the line-pressure passage 88 is controlled by controlling the pressure regulating valve 48, based on the detected throttle opening angle $\theta$ and the calculated speed ratio $e_c$, and according to a predetermined relationship for establishing an optimum tension of the belt 40, namely, a minimum tension that permits the CVT 16 to operate without slipping of the belt 40, with a minimum amount of power loss of the oil pump 84.

The electronic control device 106 includes means for determining whether or not the calculated speed ratio $e_t$ of the torque converter 12 has exceeded a predetermined reference value $\alpha$, that is, whether or not the output torque of the torque converter 12 is substantially larger than the input torque, or whether or not the converting period of the torque converter 12 (torque amplification by the converter 12) is substantially terminated. When the speed ratio $e_t$ is smaller than the reference value $\alpha$, the control device 106 applies the high-pressure signal to the switch valve 98 to place it in the high-pressure position, for applying the line pressure Pl to the second fluid chamber 78, so that the pressure of engagement of the belt 40 with the output side pulley 38 (and the input side pulley 36) is substantially doubled. It will be understood that the reference value $\alpha$ corresponds to the end of the converting period of the torque converter 12, and is slightly smaller than "1", as indicated in FIG. 1.

During a steady-state running of the vehicle, the speed ratio $e_t$ of the torque converter 12 exceeds the reference value $\alpha$, and the switch value 98 is placed in the low-pressure position for applying the lubrication pressure Po (reduced pressure lower than the line pressure Pl) to the second fluid chamber 78. In this condition, the pressure of engagement of the belt 40 is produced only by the line pressure Pl acting on the pressure-receiving surface of the first fluid chamber 76.

When the vehicle is started with a certain angle of opening of the throttle valve, however, the speed ratio $e_t$ of the torque converter 12 is smaller than the reference value $\alpha$, and the switch valve 98 is therefore operated to the high-pressure position for applying the line pressure Pl also to the second fluid chamber 78. As a result, the thrust of the output side cylinder 46 is increased to avoid slipping of the belt 40 on the pulleys 36, 38, even while the input torque received by the CVT 16 is higher during starting of the vehicle due to the torque amplification by the torque converter 12, than during the steady-state running of the vehicle.

As described above, the output side hydraulic cylinder 46 used in the present embodiment has the first and second fluid chambers 76, 78, and the line pressure Pl is normally applied to the first chamber 76 while the reduced lubrication pressure Po is applied to the second chamber 78. The line pressure Pl is controlled based on the detected throttle opening angle $\theta$ and the calculated speed ratio $e_c$. When the control device 106 determines that the output torque of the torque converter 12 is larger than the input torque of the same, with the speed ratio $e_t$ not exceeding the reference value $\alpha$, the switch valve 98 is switched to the high-pressure position for applying to the second fluid chamber 78 the line pressure Pl in place of the comparatively low lubrication pressure Po, so as to substantially double the pressure of engagement of the belt 40 with the pulleys 36, 38. This hydraulic control arrangement is contrary to the known arrangement in which the line pressure Pl is almost doubled so as to deal with the torque amplification by the torque converter 12. The present arrangement therefore is free from the conventional requirements for high operational accuracy or precision of the oil pump 84 and valve 48, high strength or rigidity of the components of the cylinder 46 and bodies of the valve 48 and oil pump 84, and high pressure tightness of the sealing members of the hydraulic system. Accordingly, the instant hydraulic control apparatus may be constructed in a reduced size and available at a reduced cost. Further, the power loss of the oil pump 84 conventionally experienced due to the doubling of the line pressure Pl is eliminated.

Referring to FIGS. 4, 5, 6 and 7, there will be described some modified embodiments of the present invention. In these embodiments, the same reference numerals as used in the preceding embodiment will be used to identify the functionally corresponding elements, and no redundant description of these elements will be provided in the interest of brevity and simplification.

In the embodiment of FIG. 4, the first fluid chamber 76 has a first pressure-receiving surface whose area is A1, while the second fluid chamber 78 has a second pressure-receiving surface whose area A2 is larger than the area A1. Further, a second solenoid-operated switch valve 120 is provided. This switch valve 120 has a low-pressure position for applying the lubrication pressure Po in the low-pressure passage 92 to the first fluid chamber 76, and a high-pressure position for applying the line pressure Pl in the line-pressure passage 88 to the first fluid chamber 76. The control device 106 receives a reaction force signal generated by a reaction force sensor 122. This signal indicates the reaction force of the stator 30 received from the fluid mass. Since the reaction force of the stator 30 represents the output torque of the torque converter 12 (input torque of the CVT 16), the control device 106 may detect the input torque of the CVT 16 based on the reaction force signal received from the sensor 122.

In operation, the control device 106 operates to change the pressure of engagement of the belt 40 with the pulleys 36, 38 in three steps, according to the level of the reaction force signal received from the reaction force sensor 122, as described below.

The ROM of the control device 106 stores a first reference value $\beta1$, and a second reference value $\beta2$ smaller than the first reference value $\beta1$. The control device 106 compares the level of the received reaction force signal with these reference values $\beta1$, $\beta2$. When the level of the reaction force signal exceeds the first reference value $\beta1$, the first and second switch valves 98, 120 are both placed in their high-pressure positions, whereby the line pressure Pl is applied to both of the first and second fluid chambers 76, 78. In this condition, the tension or pressure of engagement of the belt 40 is the highest. When the level of the reaction force signal is between the first and second reference values $\beta1$ and $\beta2$, only the second switch valve 120 is placed in the low-pressure position for applying the comparatively low lubrication pressure Po to the first fluid chamber 76. When the level of the reaction force signal is lower than the second reference value $\beta2$, the second switch valve 120 is placed in the high-pressure position for applying the line pressure Pl to the first fluid chamber 76, while the first switch valve 98 is placed in the low-pressure position for applying the lubrication pressure Po to the second fluid chamber 78. Thus, the pressure of engagement of the belt 40 can be changed in three steps such that the engagement pressure increases with the reaction force of the stator 30, i.e., with the output torque of the torque converter 12 or the input torque of the CVT 16. The present embodiment therefore provides the same advantages as described above with respect to the first embodiment.

The embodiment of FIG. 4 may be modified to change the pressure of engagement of the belt 40 in four steps, by placing the first and second switch valves 98, 120 in the low-pressure positions for applying the lubrication pressure Po to both of the first and second fluid chambers 76, 78, when the level of the reaction force signal from the sensor 122 falls below a third reference value $\beta3$ smaller than the second reference value $\beta2$.

Figure 5:
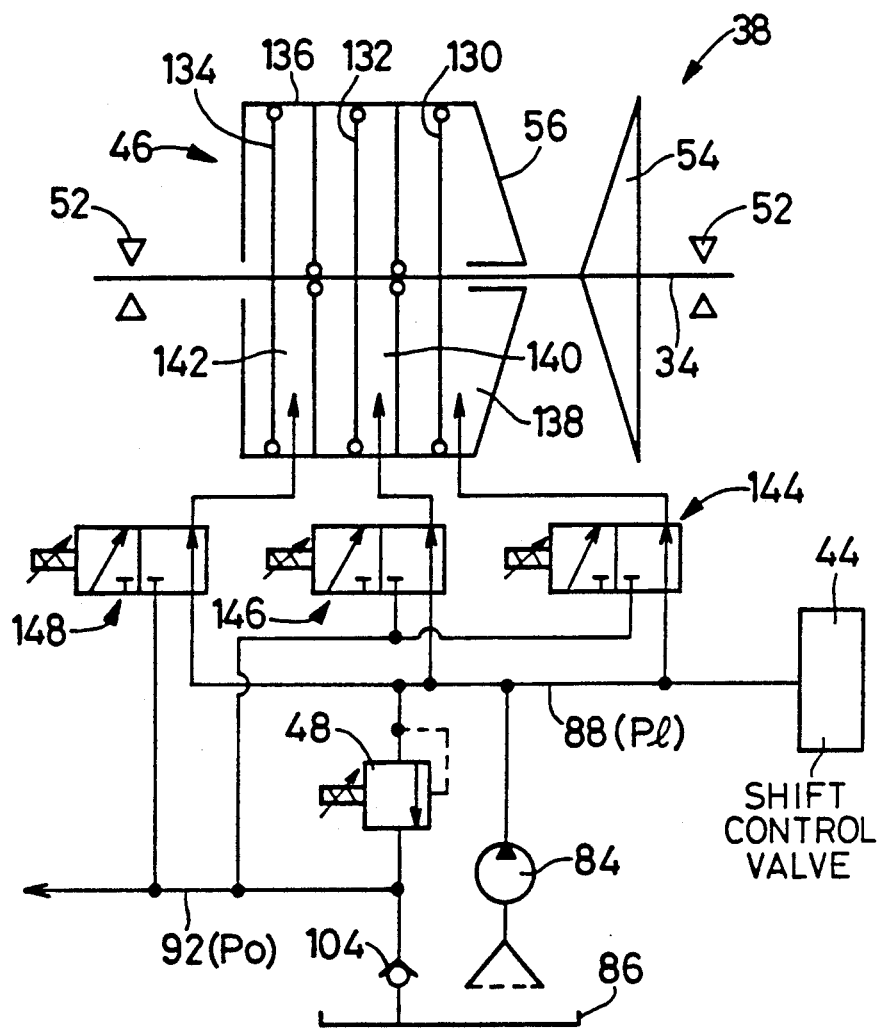

In the third embodiment of FIG. 5, the output side hydraulic cylinder 46 has three fluid chambers for changing the pressure of engagement of the belt 40. More specifically, a first, a second and a third disk 130, 132, 134 are secured to the output shaft 34 such that the three disks are spaced apart from each other in the axial direction of the shaft 34. A cylinder member 136 is fixed to the movable rotor 56 such that the three disks 130, 132, 134 are held in sliding contact with the inner surface of the cylinder member 136. The movable rotor 56, three disks 130, 132, 134 and cylinder member 136 cooperate to define a first, a second and a third fluid chamber 138, 140, 142. Between the fluid chambers 138, 140, 142 and the line-pressure passage 88 and low-pressure passage 92, respective three switch valves 144, 146, 148 are provided for selectively applying the line pressure Pl or lubrication pressure Po to the chambers 138, 140, 142, depending upon the level of the reaction force signal received from the reaction force sensor 122. When the level of the reaction force signal exceeds the first reference value $\beta1$, all of the three switch valves 144, 146, 148 are placed in the high-pressure position. When the level of the signal is between the first and second reference values $\beta1$, $\beta2$, the first and second switch valves 144, 146 are placed in the high-pressure position while the third switch valve 148 is placed in the low-pressure position. When the level of the signal is lower than the second reference value $\beta2$, only the first switch valve 144 is placed in the high-pressure position. Thus, the pressure of engagement of the belt 40 is changed in three steps.

Figure 6:
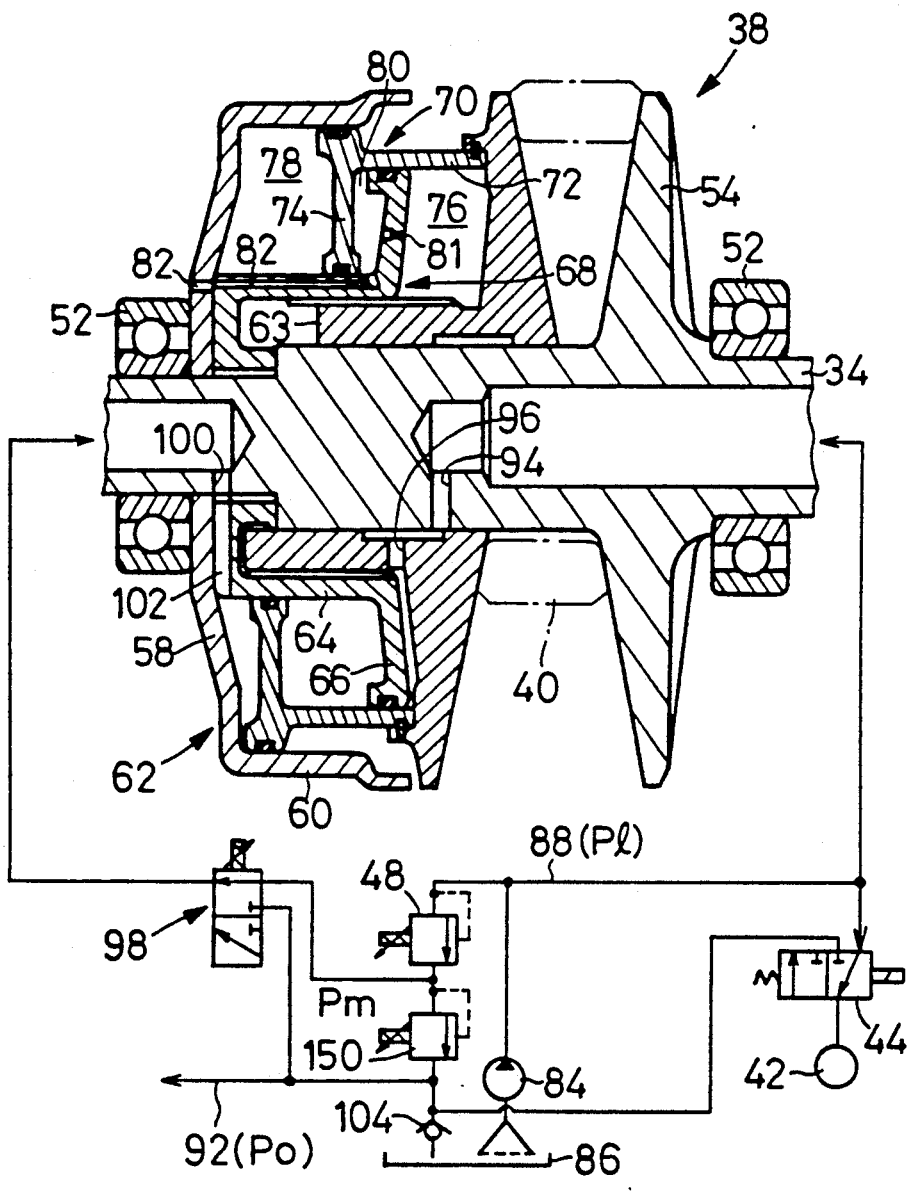

In the fourth embodiment of FIG. 6, one of two reduced pressures Po and Pm both lower than the line pressure Pl is selectively applied to the second fluid chamber 78, for changing the pressure of engagement of the belt 40 by the hydraulic cylinder 46.

In FIG. 6, reference numeral 150 denotes a second pressure regulating valve which is provided between the first pressure regulating valve 48 for producing the line pressure Pl, and the check valve 104 for producing the lubrication pressure Po as a second reduced pressure. The second pressure regulating valve 150 controls the amount of flow of the fluid into the low-pressure passage 92, thereby producing a first reduced pressure Pm between the two valves 48, 150. This first reduced pressure Pm is lower than the line pressure Pl and is higher than the second reduced pressure or lubrication pressure Po in the low-pressure passage 92. Both the first and second reduced pressures Pm, Po are applied to the switch valve 98. When the switch valve 98 is placed in the low-pressure position, the second reduced pressure or lubrication pressure Po is applied to the second fluid chamber 78. With the switch valve 98 placed in the high-pressure position, the first reduced pressure Pm is applied to the second fluid chamber 78. Thus, the present embodiment is adapted to change the total area of the pressure-receiving area of the hydraulic cylinder 46 which receives the controlled pressure which consists of the line pressure Pl and the first reduced pressure Pm. With the switch valve 98 operated under the control of the control device 106, the pressure of engagement of the belt 40 is changed in two steps.

Figure 7:
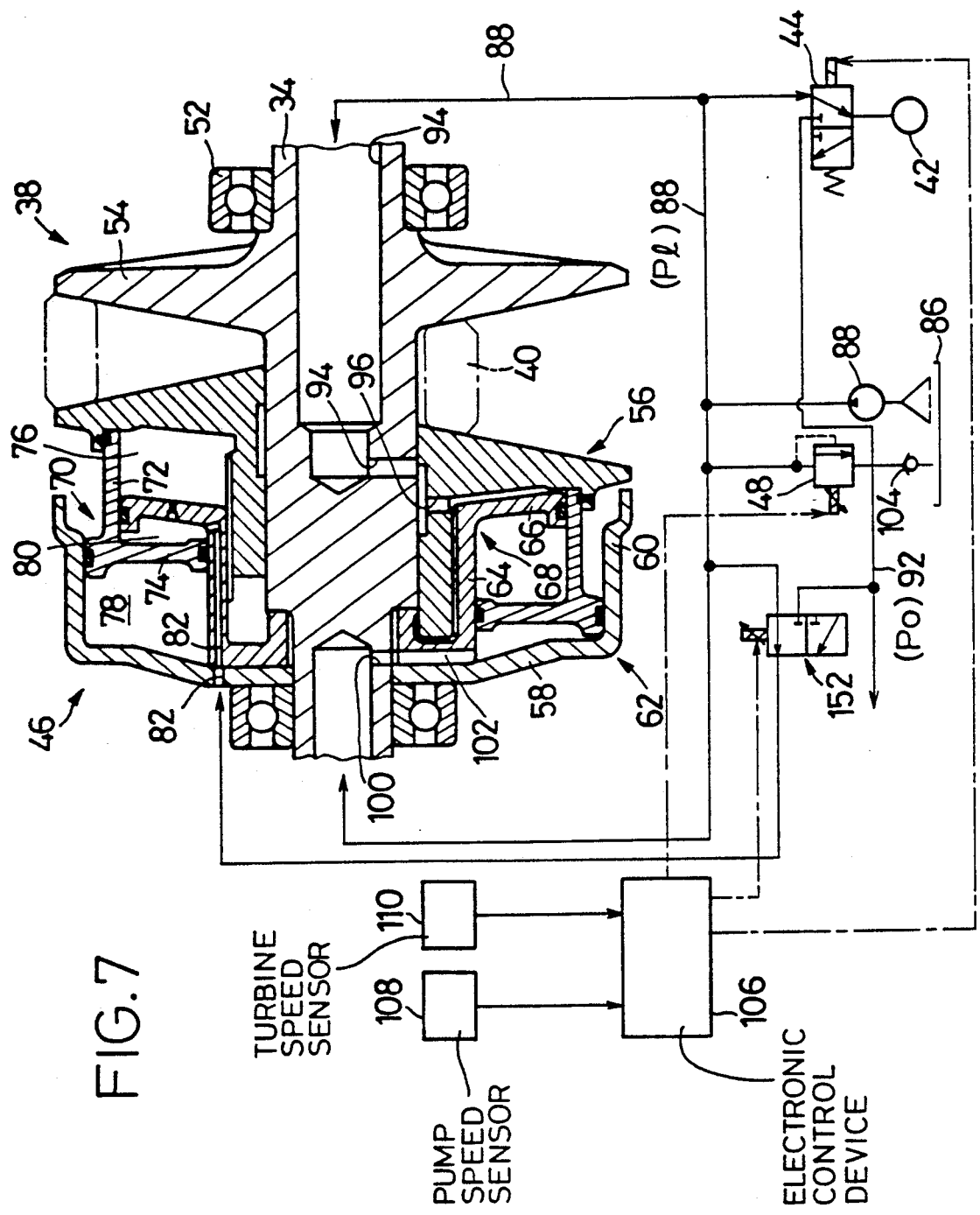

In the fifth embodiment of FIG. 7, one of the line pressure Pl and the lubrication pressure Po is selectively applied to the third fluid chamber 80, for changing the pressure of engagement of the belt 40 by the hydraulic cylinder 46.

In FIG. 7, the first and third fluid chambers 76, 80 are disconnected from each other, in the absence of the restricted passage 81 which is provided in the first embodiment of FIG. 1 for fluid communication between these fluid chambers 76, 80. Further, a third switch valve 152 is provided in place of the switch valve 98 used in the first embodiment. The third switch valve 152 has a high-pressure position for fluid communication between the line-pressure passage 88 and the third fluid chamber 80 through the fluid passage 82, and a low-pressure position for fluid communication between the low-pressure passage 92 and the third fluid chamber 80 through the fluid passage 82. The third switch valve 152 is placed either in the high-pressure position in which the line pressure Pl acts on the third pressure-receiving surface of the third fluid chamber 80, or in the low-pressure position in which the lubrication or reduced pressure Po acts on the pressure-receiving surface of the third fluid chamber 80. The first and second fluid chambers 76, 78 are both held in fluid communication with the line- pressure passage 88, such that the line pressure Pl are always applied to these fluid chambers 76, 78.

When the speed ratio $e_t$ of the torque converter 12 exceeds the reference value $a$ during the steady-state running of the vehicle, the control device 106 operates the third switch valve 152 to be placed in the high-pressure position for applying the line pressure Pl to the third fluid chamber 80. As a result, the thrust which is produced by the line pressure Pl applied to the second fluid chamber 78 is substantially counterbalanced by the line pressure Pl applied to the third fluid chamber 80. Consequently, the pressure of engagement of the belt 40 with the pulleys 36, 38 is produced only by the line pressure Pl applied to the first fluid chamber 76.

When the speed ratio $e_t$ of the torque converter 12 is smaller than the reference value $a$, i.e., when the input torque received by the input shaft 32 of the CVT 16 is relatively high during the starting of the vehicle, the third switch valve 152 is operated to the low-pressure position for applying the lubrication pressure Po to the third fluid chamber 80. As a result, the thrust of the output side hydraulic cylinder 46 is significantly increased to increase the pressure of engagement of the belt 40. Thus, the pressure of engagement of the belt 40 is changed in two steps. The present embodiment therefore provides the same advantages as described above with respect to the first embodiment.

In the case where the motor vehicle is started without undergoing a rapid increase in the input torque received by the input shaft 32 of the CVT 16, that is, where the motor vehicle is not required to avoid slipping of the belt 40 when the speed ratio $e_t$ of the torque converter 12 is smaller than the reference value $a$, the third switch valve 152 is placed in the low-pressure position while the vehicle runs at a relatively low speed, and in the high-pressure position while the vehicle runs at a relatively high speed. This hydraulic control arrangement of FIG. 7 serves to avoid an excessive increase in the amount of thrust of the hydraulic cylinder 46 for producing the pressure of engagement of the belt 40 with the pulleys 36, 38, which occurs due to the centrifugal force produced by the rotating cylinder 46.

Where the third fluid chamber 80 communicates with the atmosphere as in the first embodiment, the fluid chamber 80 functions to only partially offset or cancel a rise in the pressures in the first and second fluid chambers 76, 78 which occurs due to the centrifugal force as described above, even if the third fluid chamber 80 is filled with a working fluid. In the hydraulic control arrangement of the instant embodiment of FIG. 7, a controlled pressure of the fluid acts on the third pressure-receiving surface of the third fluid chamber 80. More specifically, the line pressure Pl or the lubrication pressure Po is selectively applied to the third fluid chamber 80, depending upon the running speed of the vehicle, by switching the switch valve 152 between the high-pressure and low-pressure positions, as described above. This arrangement enables the hydraulic cylinder 46 to ideally offset or cancel the rise in the pressures therein due to the centrifugal force which increases as the running speed of the vehicle gets higher. The same effect may be provided in the embodiments of FIGS. 4 and 6, if the restricted passage 81 is removed, and the third switch valve 152 is provided for changing the pressure applied to the third fluid chamber 80, according to the vehicle running speed.

While the present invention has been described in its presently preferred embodiments for illustrative purpose only, the invention may be otherwise embodied.

In the illustrated embodiments, the switch valves 98, 120 are connected to the low-pressure passage 92 for applying the lubrication pressure Po to the second or first fluid chamber 78, 76 when the valves 98, 120 are placed in the low-pressure position. However, the switch valves 98, 120 may be connected to a drain line open to the atmosphere so that the fluid chamber 87, 76 communicates with the atmosphere when the valves are placed in the low-pressure position.

Although the input torque of the CVT 16 is detected based on the speed ratio $e_t$ of the torque converter 12 or the reaction force of the stator 30 in the illustrated embodiments, it is possible that an increase in the input torque of the CVT 16 which occurs for a reason other than the torque amplification by the torque converter 12 is also detected based on suitable variables or parameters such as the currently established gear ratio of the reversing device 14 where the device 14 has two or more forward drive positions, and the currently selected position of a selector switch for selecting a powerful driving mode of the vehicle in which a specific relationship is used to determine the desired speed Nin* of the input shaft 32 of the CVT 16 for controlling the speed ratio $e_c$ of the CVT 16.

Further, the line pressure Pl may be applied to the second fluid chamber 78 only while the detected throttle opening angle $\theta$ is relatively large. In essence, the thrust of the output side hydraulic cylinder 46 is increased to increase the pressure of engagement of the belt 40 with the pulleys 36, 38 by applying the controlled line pressure Pl also to the second fluid chamber 78 when the input torque received by the input shaft 32 of the CVT 16 is relatively high.

In the first embodiment of FIG. 2, the line pressure Pl is always applied to the first fluid chamber 76, and the line pressure Pl or the comparatively low lubrication pressure Po is selectively applied to the second fluid chamber 78 by switching the switch valve 98 between the high-pressure and low-pressure positions. However, it is possible that the line pressure Pl is always applied to the second fluid chamber 78, while the switch valve 98 is used for selectively applying the line pressure Pl or lubrication pressure Po to the first fluid chamber 76.

While the illustrated embodiments of the hydraulic control apparatus are applied to the belt-and-pulley type continuously variable transmission 16, the principle of the invention may be equally applicable to a traction type continuously variable transmission as disclosed in Publication No. 63-29142 of examined Japanese Patent Application, wherein input and output cone members coaxially disposed in mutually facing relation with each other are connected by rollers interposed therebetween as a power transmitting member. Each roller has an axis of rotation which is pivotable in a plane which includes the axis of rotation of the cone members. In this case, the area of the pressure-receiving surface of a hydraulic actuator for controlling the pressure of engagement of the rollers with the cone members is changed in the same manner as described above with respect to the CVT 16, for changing the power transmitting capacity of the traction type CVT.

It will be understood that the invention may be embodied with various other changes, modifications and improvements, which may occur to those skilled in the art, without departing from the spirit and scope of the invention defined in the following claims.

What is claimed is:

1. An apparatus for controlling a hydraulically operated continuously variable transmission for a motor vehicle, which has an input member, an output member and a lower transmitting member connecting the input and output members to affect power transmission therebetween, and whose power transmitting capacity changes with a pressure of engagement of said power transmitting member with said input and output member, comprising:
   torque detecting means for detecting an input torque received by said input member of said continuously variable transmission;
   a hydraulic actuator having a pressure-receiving surface defined by at least two fluid chambers and which receives a controlled pressure having at least two values, one of said values being larger than another of said values, for controlling said pressure of engagement of said power transmitting member; and
   engagement pressure changing means responsive to said torque detecting means, for changing said pressure of engagement of said power transmitting member by selectively applying said values of said controlled pressure to at least one of said at least two chambers, to thereby change the area of said hydraulic actuator which receives the larger of said values, and so to thereby change the pressing force to said power transmitting member, with said input torque detected by said torque detecting means.

2. An apparatus according to claim 1, wherein said continuously variable transmission receives power from an engine through a torque converter, and said torque detecting means includes means for detecting a ratio of an output speed of said torque converter to an input speed of the torque converter, said torque detecting means affecting a determination, based on said ratio, as to whether an output torque of said torque converted transmitted to said transmission is larger than an input torque of said torque converter, said engagement pressure changing means changing said area of the pressure-receiving surface of said hydraulic actuator which receives the larger of said values, based on said determination.

3. An apparatus according to claim 1, wherein said continuously variable transmission receives power from an engine through a torque converter having a stator, and said torque detecting means includes means for detecting a reaction force of said stator, and detects said input torque of said continuously variable transmission based on said reaction force.

4. An apparatus according to claim 1, wherein said continuously variable transmission includes a pair of pulleys as said input and output members, a pair of hydraulic cylinders for changing effective diameters of said pair of pulleys, respectively, and a transmission belt as said power transmitting member connecting said pair of pulleys, one of said pair of hydraulic cylinders which corresponds to said output member serving as said hydraulic actuator, and having a first and a second fluid chamber as said at least two fluid chambers, each of said fluid chambers having a pressure-receiving surface receiving said controlled pressure for producing a thrust in a direction so as to increase the pressure of engagement of said belt with said pulleys.

5. An apparatus according to claim 4, wherein said continuously variable transmission receives power from an engine having a throttle valve, the apparatus further comprising a pressure regulating valve for regulating a line pressure as the larger of said values so as to establish an optimum value of said pressure of engagement of said belt, based on a speed changing ratio of the transmission and an angle of opening of said throttle valve, and means for lowering said line pressure to a reduced pressure,
   and wherein said engagement pressure changing means includes means for comparing said input torque of said continuously variable transmission detected by said torque detecting means with a predetermined reference value, said engagement pressure changing means applying said line pressure and said reduced pressure to said first and second fluid chambers, respectively, when the detected input torque of the transmission is smaller than said reference value, said engagement pressure changing means applying to said second fluid chamber said line pressure in place of said reduced pressure when said detected input torque exceeds said reference value.

6. An apparatus according to claim 4, wherein said continuously variable transmission receives power from an engine having a throttle valve, an area of the pressure-receiving surface of said first fluid chamber being smaller than that of said second fluid chamber, the apparatus further comprising a pressure regulating valve for regulating a line pressure as the larger of said values so as to establish an optimum value of said pressure of engagement of said belt, based on a speed changing ratio of the transmission and an angle of opening of said throttle valve, and means for lowering said line pressure to a reduced pressure, and wherein said engagement pressure changing means compares said input torque of said transmission detected by said torque detecting means with a predetermined first reference value and a predetermined second reference value higher than said first reference value, said engagement pressure changing means applying said line pressure and said reduced pressure to said first and second fluid chambers, respectively, when the detected input torque of said transmission is smaller than said first reference value, said engagement pressure changing means applying said reduced pressure and said line pressure to said first and second fluid chambers, respectively, when said detected input torque is between first and second reference values, said engagement pressure changing means applying said line pressure to both of said first and second fluid chambers, when said detected input torque is higher than said second reference value.

7. An apparatus according to claim 4, wherein said continuously variable transmission receives power from an engine having a throttle valve, the apparatus further comprising a pressure regulating valve for regulating a line pressure so as to establish an optimum value of said pressure of engagement of said belt, based on a speed changing ratio of the transmission and an angle of opening of said throttle valve, means for lowering said line pressure to a first reduced pressure as the larger of said values, and means for lowering said line pressure to a second reduced pressure lower than said first reduced pressure, and wherein said engagement pressure changing means compares said input torque of said transmission detected by said torque detecting means with a predetermined reference value, said engagement pressure changing means applying said line pressure and said first reduced pressure to said first and second fluid chambers, respectively, when the detected input torque of said transmission is smaller than said predetermined reference value, said engagement pressure changing means applying said line pressure and said second reduced pressure to said first and second fluid chambers, respectively, when said detected input torque is higher than said reference value.

8. An apparatus according to claim 1, wherein said continuously variable transmission includes a pair of pulleys as said input and output members, a pair of hydraulic cylinders for changing effective diameters of said pair of pulleys, respectively, and a transmission belt as said power transmitting member connecting said pair of pulleys, one of said pair of hydraulic cylinders which corresponds to said output member serving as said hydraulic actuator, and having a first, a second and a third fluid chamber as said at least two fluid chambers each of said fluid chambers having a pressure-receiving surface receiving said controlled pressure for producing a thrust in a direction so as to increase the pressure of engagement of said belt with one of said pulleys.

9. An apparatus according to claim 8, wherein said continuously variable transmission power receives power from an engine having a throttle valve, the apparatus further comprising a pressure regulating valve for regulating a line pressure as the larger of said values so as to establish an optimum value of said pressure of engagement of said belt, based on a speed changing ratio of the transmission and an angle of opening of said throttle valve, and means for lowering said line pressure to a reduced pressure, and wherein said engagement pressure changing means compares said input torque of said transmission detected by said torque detecting means with a predetermined first reference value and a predetermined second reference value higher than said first reference value, said engagement pressure changing means applying said line pressure to said first fluid chamber and applying said reduced pressure to said second and third fluid chambers, when the detected input torque of said transmission is smaller than said first reference value, said engagement pressure changing mans applying said line pressure to said first and second fluid chambers and applying said reduced pressure to said third fluid chamber, when said detected input torque is between said first and second reference values, said engagement pressure changing means applying said line pressure to all of said first, second and third fluid chambers, when said detected input torque is higher than said second reference value.

10. An apparatus according to claim 1, wherein said continuously variable transmission includes a pair of pulleys as said input and output members, a pair of hydraulic cylinders for changing effective diameters of said pair of pulleys, respectively, and a transmission belt as said power transmitting member connecting said pair of pulleys, one of said pair of hydraulic cylinders which corresponds to said output member serving as said hydraulic actuator, and having a first, a second and a third fluid chamber, each of said first and second fluid chambers having a pressure-receiving surface receiving said controlled pressure for producing a thrust in a direction so as to increase the pressure of engagement of said belt with one of said pulleys, while said third fluid chamber having a pressure-receiving surface receiving said controlled pressure for producing a thrust in a direction so as to decrease said pressure of engagement of said belt, said continuously variable transmission receiving power from an engine having a throttle valve, the apparatus further comprising a pressure regulating valve for regulating a line pressure so as to establish an optimum value of said pressure of engagement of said belt, based on a speed changing ratio of the transmission and an angle of opening of said throttle valve, and means for lowering said line pressure to a reduced pressure, and wherein said area changing means compares said input torque of said transmission detected by said torque detecting means with a predetermined value, said area changing means applying said line pressure to said first, second and third fluid chambers when the detected input torque of said transmission is smaller than said reference value, said area changing means applying said line pressure to said first and second fluid chambers and applying said reduced pressure to said third fluid chamber, when said detected input torque is larger than said reference value.

* * * * *